April 19, 1955
U. RANZI
2,706,547
DEVICE FOR TRANSMITTING ROTATIONAL POWER BY USE OF POWDERY MATERIAL
Filed May 7, 1947
3 Sheets-Sheet 1
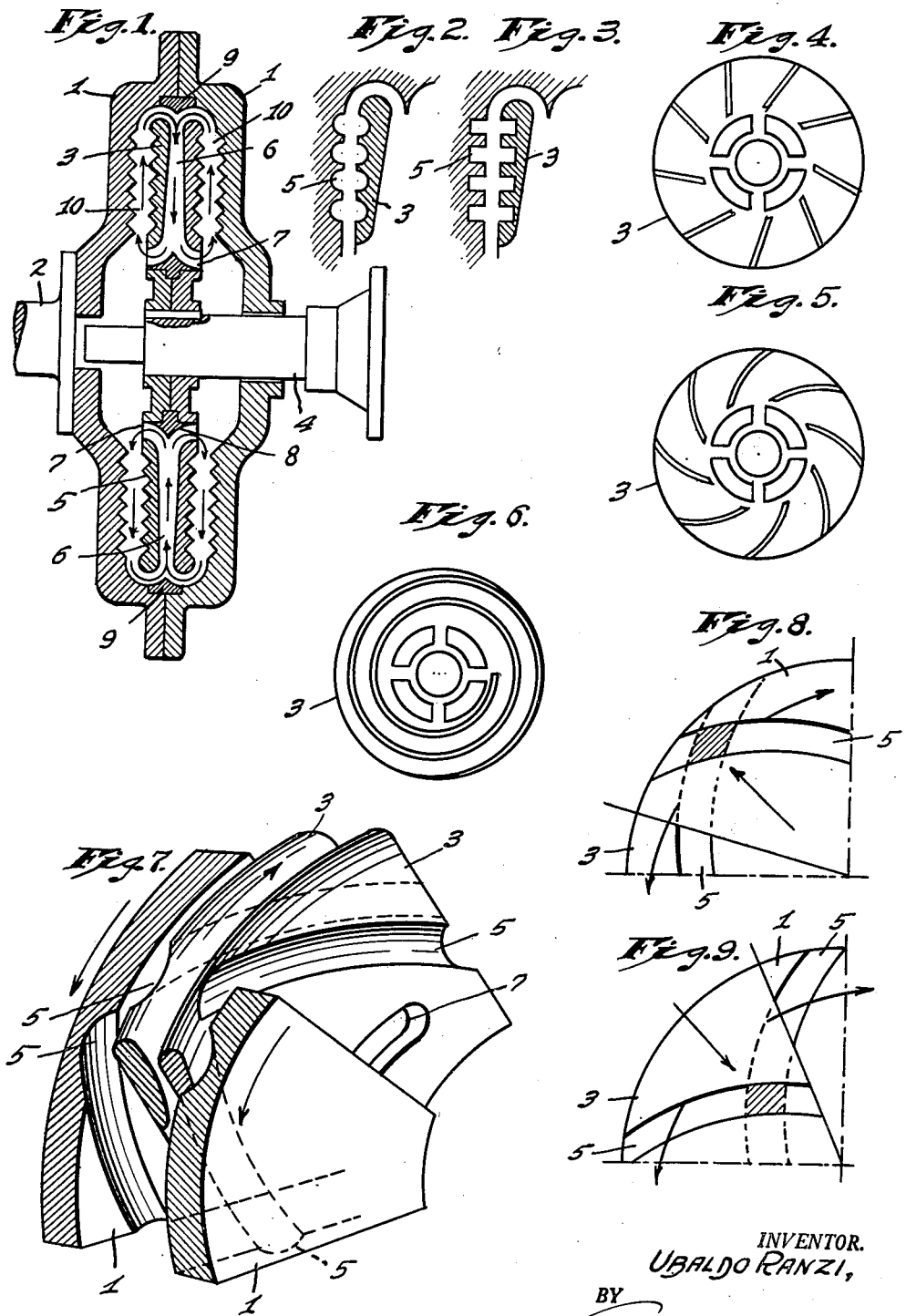
INVENTOR.
UBALDO RANZI,
BY
ATTORNEYS.

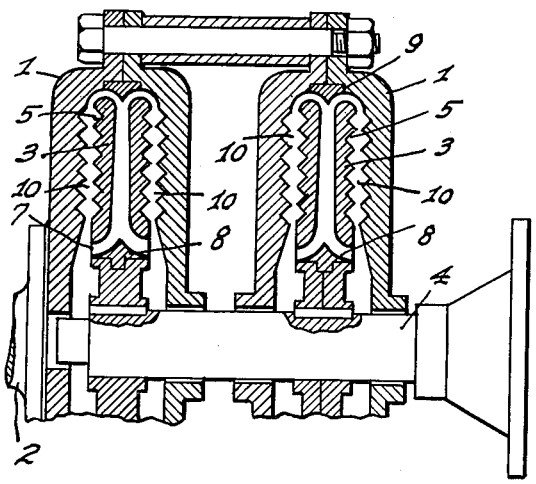
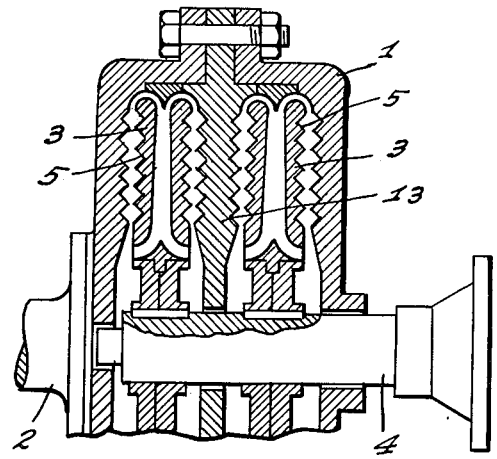
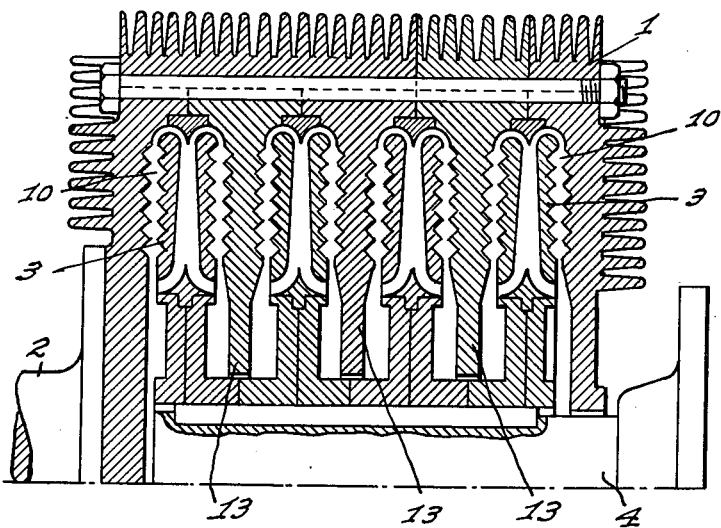

April 19, 1955
U. RANZI
2,706,547
DEVICE FOR TRANSMITTING ROTATIONAL
POWER BY USE OF POWDERY MATERIAL
Filed May 7, 1947
3 Sheets-Sheet 3
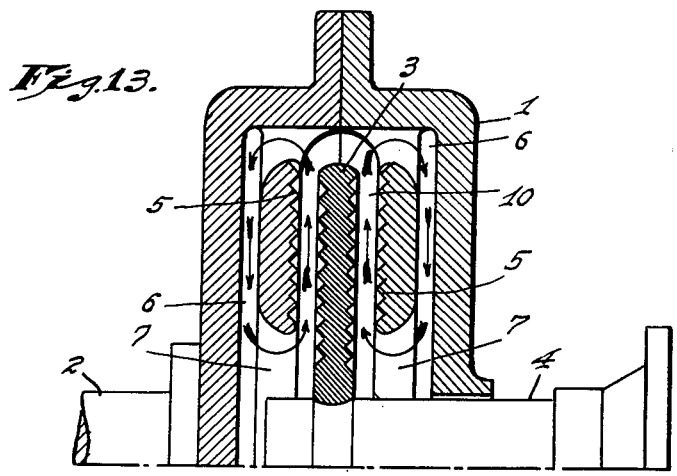
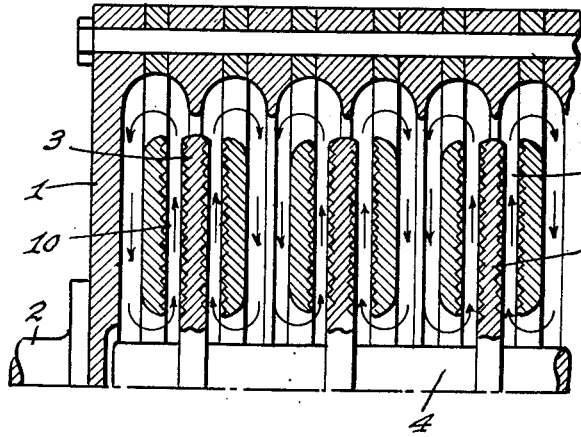
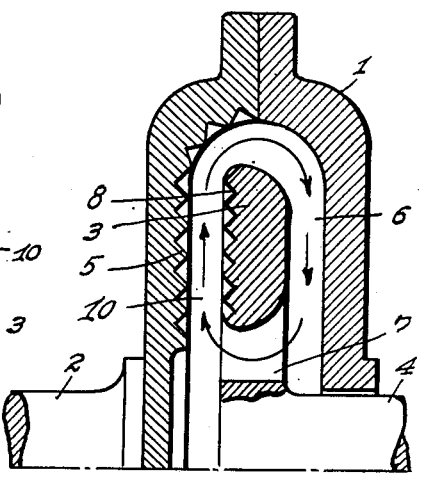
INVENTOR.
UBALDO RANZI,
BY
ATTORNEYS.

United States Patent Office 2,706,547
Patented Apr. 19, 1955

2,706,547

DEVICE FOR TRANSMITTING ROTATIONAL POWER BY USE OF POWDERY MATERIAL

Ubaldo Ranzi, Legnano, Italy

Application May 7, 1947, Serial No. 746,458

Claims priority, application Italy May 15, 1946

13 Claims. (Cl. 192—58)

The connection between a driving rotating member and a driven rotating member has hitherto been accomplished by means of a couplings of different types, divided into rigid and elastic couplings in which the average speeds of the two rotating members are always equal, and slippable couplings, such as for instance hydraulic and centrifugal ones, allowing, at least for limited intervals, a substantial difference of speed between the driving and the driven member.

Among centrifugal couplings, those provided with pulverised or granular material have been the object of several studies and researches. The practical embodiment of these couplings encounters however some difficulties, perhaps the chief one of which is the high heat generated as the result of friction. In some instances, temperatures within the mass of pulverized or granular material may rise so high as to damage such material and interfere with the performance of the coupling. It is possible to remedy this difficulty, at least in part, by employing oversize couplings; but such a solution is uneconomical and is frequently prevented by space limitations.

It is an object of this invention to improve the performance of torque-transmitting couplings employing powder or other granular material as a torque-transmitting medium. It is another object of the invention to speed the dissipation of the heat generated within such a coupling when the driving and driven members are rotating at different rates.

In carrying out the invention, I form the coupling members in such a way as to provide a path over which the powder may circulate, and I further provide one or both of the coupling members with means which act, when the coupling is slipping, to induce a circulation of the powder over such path. In the preferred form of couplings, the circulatory path includes a stretch having radial extent and defined by opposed surfaces on the driving and driven members respectively, one or both of such surfaces being provided with spirally inclined grooves or ribs which act upon relative rotation of the powder and the grooved or ribbed surfaces to urge the powder in a radial direction.

The accompanying drawings illustrate the invention:

Fig. 1 is an axial section through a coupling;

Figs. 2 and 3 are fragmental sections illustrating different shapes which may be provided for the spirally inclined grooves used to produce circulation of the powder;

Figs. 4, 5, and 6 are elevations of coupling-element faces illustrating different forms which spirally inclined, powder-circulating grooves or ribs may take;

Fig. 7 is a fragmental isometric view, on an enlarged scale, of the coupling shown in Fig. 1;

Figs. 8 and 9 are diagrammatic views illustrating the action of spirally inclined powder-circulating grooves or ribs;

Figs. 10, 11, and 12 are axial-sections illustrating various forms of multiple-unit couplings;

Fig. 13 is an axial section illustrating another modified coupling;

Fig. 14 is an axial section illustrating a coupling embodying a plurality of the units shown in Fig. 13; and Fig. 15 is an axial section illustrating still another modified form of coupling.

The coupling shown in Fig. 1 comprises a hollow housing 1 secured to a shaft 2 and a disc 3 located within said housing and secured to a shaft 4 which extends into the housing through an axial opening in one wall thereof. The disc is smaller in all dimensions than the interior of the housing in order to provide space for the reception of the mass of powder through which torque is to be transmitted between the disc and housing. The disc and housing have, on opposite sides of the disc 3, opposed, spaced wall surfaces possessing radial extent and defining passages 10. The surfaces defining the passages 10 are provided with spirally inclined grooves 5 which may have any desired cross-sectional shape, such as the triangular shape shown in Fig. 1, the semi-circular shape shown in Fig. 2 or the rectangular shape shown in Fig. 3. The grooves may extend rectilinearly across the face which contains them, as indicated in Fig. 4, or they may be curved as indicated in Fig. 5. In place of a series of grooves, there may be a single continuous spiral groove such as is shown in Fig. 6. Alternatively, the grooves may be replaced with ribs projecting axially from the face of the coupling element which bears them. In any event, the opposed faces of the disc and housing are provided with ribs or grooves having powder-engaging surfaces or surface portions whose distance from the coupling axis increases in one rotational direction about such axis.

The disc 3 of Fig. 1, which may conveniently be formed of two main parts, possesses a passage 6, shown as circumferentially continuous, which extends radially inward from the periphery of the disc and opens into the side faces of the disc through ports 7. At the inner end of the passage 6, the disc may have a deflecting ring 8 serving to deflect into the ports 7 powder moving inwardly through the passage 6. The housing 1, which likewise may be made in two main parts, may also have a deflecting ring 9 positioned opposite the outer end of the passage 6 and serving to deflect powder into that passage.

It is intended that the coupling shown in Fig. 1 will contain a mass of powdered material somewhat less in volume than that required to fill the space between the disc and housing. In practice, I prefer to employ powder in volume such that when distributed circumferentially around the coupling and filling the passage 6 its inner surface will be approximately flush with the inner ends of the ports 7.

When a coupling such as has so far been described is placed in operation, the powder will distribute itself uniformly around the circumference of the coupling between the housing and disc. Hereafter, it will be assumed that the housing is the driving element of the coupling, although that is not necessary. When the housing 1 begins to rotate, friction between it and the powder tends to cause the powder to rotate with the housing, and under the influence of centrifugal force, the powder will distribute itself circumferentially. Friction between the rotating powder mass and the disc 3 will tend to cause the latter to rotate; but initially the torque transmitted from the powder to the disc will be slight and usually insufficient to cause disc-rotation. Accordingly, relative rotation between the disc and housing will exist and the powder will slip either relatively to the disc, to the housing, or to both. The spiral inclination of the elements 5 is such that upon circumferential slippage of the powder adjacent the grooved surface the powder will be urged radially outward. This action of the grooves 5 induces powder circulation as indicated by the arrows in Fig. 1, the powder moving outwardly through the passages 10 and inwardly through the passage 6.

The circulation of powder just referred to is opposed by friction both between the interengaging faces of the powder and the coupling elements and within the body of the powder itself. As the speed of the housing 1 increases, the resultant increase in centrifugal force causes the powder to bear with greater pressure against the faces of the disc and housing and also, by its packing effect, tends to increase friction within the mass of powder. The increase in the pressure which the powder exerts on the housing and disc will increase friction between the powder and the coupling elements, while the increase in friction within the powder will increase its resistance to flow. These various factors co-operate to cause a progressive increase in the torque applied to the driven disc 3, and that element will begin to rotate as soon as the torque applied to it exceeds the exterior load opposing its rotation. As the disc accelerates, it will approach the speed of the housing; and if the torque applied to the disc is not too great for the capacity of the coupling, the disc will eventually attain the speed of the housing and the coupling will operate without slippage, torque being transmitted from the housing to the powder and from the powder to the disc as a result of the friction existing because of the pressure with which the powder bears on the surfaces of the disc and housing.

Whenever any slippage is occurring within the coupling, either during the starting period or as the result of an overload, the powder will circulate in the manner above described. This circulation serves to convey heat by convection from the disc to the housing and thus speeds the dissipation of the heat which friction generates. In addition, the circulatory movement of the powder causes a certain stirring action which tends to limit the duration of the interval in which any one powder grain slips in direct contact with the surface of one of the coupling elements. As the heat is generated at the interfaces between the powder and the coupling elements, the circulatory action thus tends to eliminate the possibility that the powder will be damaged by subjection to excessive temperatures.

The torque transmitted from the housing to the disc, whether under slipping or non-slipping conditions, depends upon rotational speeds, on the diameter of the disc, on the shape of the spirally inclined powder-circulating elements, and on the density and other characteristics of the powder. Of course, when the coupling is operating without slippage, there will be no heat generation and no powder circulation, both of the coupling elements and the powder rotating as a unitary mass.

The above description of operation applies only to conditions existing when the relative rotation of housing and disc is in a direction such that the spirally inclined powder-circulating elements urge outwardly the powder they engage. For relative rotation in the other direction, a different action occurs. Should the disc, for example, tend to overrun the coupling 1, the relative direction of torque-transmission would be reversed and the powder-engaging elements 5 would tend to urge the engaged powder inwardly. In so doing, they would counteract the effect of centrifugal force, reduce pressure within the mass of powder, and lessen all frictional forces. This action is indicated in Figs. 8 and 9. In those figures, the shaded areas represent a mass of powder defined by the intersection of a housing-groove 5 (indicated entirely in full lines) and a disc-groove 5 (indicated partially in dotted lines). In Fig. 8, it is assumed that the housing is rotating in a clockwise direction and driving the disc. In the event of slippage, the relative annular displacement of the grooves illustrated in Fig. 8 will cause the powder represented by the shaded areas to be forced outwardly, as indicated by the radial arrow, and the action will supplement the effect of centrifugal force in increasing pressure within the powder and from the powder to the coupling elements. If there is no slippage, there will be no radial displacement of the powder represented by the shaded area; but the force exerted by both grooved walls on that powder will supplement centrifugal force in increasing pressures. If, on the other hand, the direction of torque transmission is reversed the forces exerted by the grooved walls on the mass of powder will be directed inwardly, as indicated by the radial arrow in Fig. 9, and the action of the grooves will oppose centrifugal force, reduce pressure, and diminish the torque transmitted.

As a result of the action just described, the coupling possesses unidirectional characteristics, being capable of transmitting much greater torques for one rotational direction of the coupling elements than for the other. In this connection, it is to be noted that powder moved inwardly by the action of the grooves 5 under a reverse torque becomes subjected to a lessened centrifugal force because of its approach to the axis of rotation.

Should it be desired to provide a coupling which will be free from the unidirectional characteristic just noted, two coupling units of the type illustrated in Fig. 1 may be grouped as indicated in Fig. 10, where the discs 3 of the two couplings are mounted on a common shaft 4 and the two housings are interconnected by an annular series of bolts 12. To free this arrangement of unidirectional characteristics the spiral grooves of the one coupling would be of opposite hand from the corresponding grooves of the other coupling.

In Fig. 11, I have shown a two-unit coupling in which two discs 3 mounted on a common shaft 4 are received in a single housing 1 divided into two disc-receiving chambers by a central partition 13. In this instance, the opposite faces of the partition 13 would be provided with spirally inclined powder-engaging elements of the proper hand.

In Fig. 12, I have illustrated a coupling embodying four discs 3 all mounted upon a common shaft and operating within chambers provided in the housing 1 by a series of axially spaced partitions 13. In this instance, the housing 1 is shown as provided with heat-radiating annular ribs.

In any of the multiple-unit couplings shown in Figs. 10, 11, and 12, corresponding sets of spirally-inclined powder-engaging elements may all be of the same hand, in which event the coupling would possess unidirectional properties but would have an augmented capacity by virtue of the increase in the number of units comprising it.

In Fig. 13 I have shown a different type of coupling in which the return passages 6 are provided in the housing 1 rather than in the disc 3, the coupling being otherwise generally similar to the coupling of Fig. 1. The spirally-inclined powder-engaging surfaces are provided on the opposed surfaces of the disc and housing defining the passages 10 through which the powder moves outwardly when circulating. The passages 6, which are formed in the housing, receive powder from the region adjacent the periphery of the disc and discharge it through ports 7 near the coupling-axis. The operation is essentially the same as that of the coupling of Fig. 1.

In Fig. 14, I have shown a coupling comprising a plurality of the individual units shown in Fig. 13. Such a coupling may have its corresponding sets of powder-circulating grooves of the same hand to increase capacity or may have corresponding groove sets of opposite hand to eliminate the unidirectional characteristic.

In Fig. 15 I have shown still another form of coupling in which the return passage 6, instead of being located wholly within one coupling member, is defined by surfaces of both. As before, the disc 3 is located axially at the center of the cavity in the housing 1, but the powder-circulating grooves are eliminated from one pair of opposed housing and disc faces and the disc is provided near the axis with ports 7 extending completely through it. In this coupling, when relative rotation is in the driving direction, the powder circulates outwardly through the passage 10 defined by the grooved surfaces of the housing and disc, passes around the periphery of the disc, flows inwardly in the passage 6 defined by the ungrooved faces of the coupling and disc, and then passes through the ports 7 to again enter the passage 10.

While I have referred to the torque-transmitting medium as a powder, it is to be understood that the invention contemplates the use of any circulating material having the properties of a powder in respect to its ability to transmit pressure, to flow, and to pack under the influence of an applied pressure. Because it moves across the surfaces of the coupling elements during periods of slippage, it is advisable that the powder be non-abrasive in character and preferably that it possess lubricating characteristics. I have found graphite and talcum to be satisfactory torque-transmitting media.

Having now particularly described and ascertained the nature of my said invention and in what manner the same is to be performed, I declare that what I claim is:

1. In a centrifugal coupling of the powder type, relatively rotatable driving and driven elements, said driving element comprising a hollow housing and said driven element comprising a rotor within said housing, said rotor being spaced from the inner surface of the housing to provide a powder-receiving space, and being provided near its center with one or more openings through which powder may pass from one side of the rotor to the other, a supply of powder within said housing; and means operative on relative rotation of said members to cause circulation of said powder outwardly along one face of the rotor, over the periphery of the rotor, inwardly along the other face of the rotor, and thence through said openings, said means comprising a spiral groove on that face of the rotor along which the powder moves outwardly.

2. The invention set forth in claim 1 with the addition that said means also includes a spirally extending groove on the inner surface of said housing.

3. In a centrifugal coupling of the powder type, relatively rotatable driving and driven members constructed and arranged to provide a circulatory path for powder contained in the coupling, said path including a portion having radial extent and defined by spaced, opposed faces of said two members, a supply of powder in said path, one of said members being provided in said path-portion with a spirally extending groove operative on relative rotation of the two members to cause outward movement of powder in said path portion.

4. The invention set forth in claim 3 with the addition that said driving member is a hollow housing and said driven member a rotor within said housing, said circulatory path being provided by a space between the inner housing surface and the side and peripheral surfaces of said rotor and by one or more openings extending through the rotor, said groove being in a side face of the rotor.

5. The invention set forth in claim 3 with the addition that said driving member is a hollow housing and said driven member a rotor within said housing, said circulatory path being provided by a space between the inner housing surface and the side and peripheral surfaces of said rotor and by one or more openings extending through the rotor.

6. In a centrifugal coupling of the powder type, relatively rotatable driving and driven members having a common axis and constructed and arranged to provide a circulatory path for powder contained in the coupling, said path including a portion defined by spaced, opposed surfaces of the driving and driven members, a supply of powder in said path, one of said members being provided in said path-portion with means having spiral-like powder-engaging surfaces whose distance from the coupling axis increases in one rotational direction about such axis and which operate upon relative rotation of the two members to circulate the powder over said path.

7. In a centrifugal coupling of the powder type, relatively rotatable driving and driven members having a common axis constructed and arranged to provide a circulatory path for powder contained in the coupling, said path including first and second interconnected portions, said first path-portion being defined by spaced, opposed surfaces of the driving and driven members, a supply of powder in said path, one of said members being provided in the first path portion with means having spiral-like powder-engaging surfaces whose distance from the coupling axis increases in one rotational direction about such axis and which operate upon relative rotation of the two members to circulate the powder over said path, said second path portion lying wholly within one of two members.

8. The invention set forth in claim 7 with the addition that said two path-portions extend radially, the powder moving outwardly away from the coupling axis in one path portion and inwardly toward such axis in the other path portion.

9. The invention set forth in claim 7 with the addition that said two path-portions extend radially, the powder moving outwardly away from the coupling axis in the first path portion and inwardly toward such axis in the other path portion.

10. In a centrifugal coupling of the powder type, relatively rotatable, approximately coaxial driving and driven members, one of said members being a housing and the other a rotor within said housing, said rotor being spaced from the inner surface of the housing to provide a powder-receiving space, a supply of powder within said housing, said powder-receiving space including first portions located on opposite sides of the rotor and a second portion communicating with the first portions and lying radially outward beyond the periphery of the rotor, said rotor having a passage extending inwardly from said second space-portion and communicating with the first space portions at points spaced inwardly from the periphery of the rotor, and means on said housing having spirally inclined powder-engaging surfaces within said first space-portions and operative on relative rotation of said two members for causing the powder to move outwardly away from the coupling-axis in said first space-portions.

11. In a centrifugal coupling of the powder type, relatively rotatable, approximately coaxial driving and driven members, one of said members being a housing and the other a rotor within said housing, said rotor being spaced from the inner surface of the housing to provide a powder-receiving space, a supply of powder within said housing, said powder-receiving space including first portions located on opposite sides of the rotor and a second portion communicating with the first portions and lying radially outward beyond the periphery of the rotor, said rotor having a passage extending inwardly from said second space-portion and communicating with the first space portions at points spaced inwardly from the periphery of the rotor, and means on said rotor having spirally inclined powder-engaging surfaces within said first space-portions and operative on relative rotation of said two members for causing the powder to move outwardly away from the coupling-axis in said first space-portions.

12. In a centrifugal coupling of the powder type, relatively rotatable, approximately coaxial driving and driven members, one of said members being a housing and the other a rotor within said housing, said rotor being spaced from the inner surface of the housing to provide a powder-receiving space, a supply of powder within said housing, said powder-receiving space including portions located on opposite sides of the rotor, said housing having passages interconnecting radially separated points of said space-portions, and means on said housing having spirally inclined powder-engaging surfaces within said space-portions and operative on relative rotation of said two members for causing the powder to move outwardly away from the coupling-axis in said space-portions.

13. In a centrifugal coupling of the powder type, relatively rotatable, approximately coaxial driving and driven members, one of said members being a housing and the other a rotor within said housing, said rotor being spaced from the inner surface of the housing to provide a powder-receiving space, a supply of powder within said housing, said powder-receiving space including portions located on opposite sides of the rotor, said housing having passages interconnecting radially separated points of said space-portions, and means on said rotor having spirally inclined powder-engaging surfaces within said space-portions and operative on relative rotation of said two members for causing the powder to move outwardly away from the coupling-axis in said space-portions.

References Cited in the file of this patent

UNITED STATES PATENTS

| | | |
|---|---|---|
| 973,893 | Tichomiroff et al. | Oct. 25, 1910 |
| 1,095,132 | Thomson | Apr. 28, 1914 |
| 1,192,233 | Severy | July 25, 1916 |
| 1,327,080 | Brown | Jan. 6, 1920 |
| 1,746,148 | Eaton | Feb. 4, 1930 |
| 1,862,045 | Beaumont et al. | June 7, 1932 |
| 1,887,610 | Widegren et al. | Nov. 15, 1932 |
| 1,901,988 | Rudquist | Mar. 21, 1933 |
| 2,287,498 | Scofield | June 23, 1942 |

FOREIGN PATENTS

| | | |
|---|---|---|
| 448,977 | Germany | Sept. 1, 1927 |